United States Patent
Bonicatto et al.

(10) Patent No.: US 8,144,816 B2
(45) Date of Patent: Mar. 27, 2012

(54) PROGRAMMABLE SIGNAL SLICER

(75) Inventors: Damian Bonicatto, Pequot Lakes, MN (US); Stuart Haug, Hackensack, MN (US)

(73) Assignee: Hunt Technologies, LLC, Pequot Lakes, MN (US)

( * ) Notice: Subject to any disclaimer, the term of this patent is extended or adjusted under 35 U.S.C. 154(b) by 656 days.

(21) Appl. No.: 12/258,720

(22) Filed: Oct. 27, 2008

(65) Prior Publication Data

US 2009/0110121 A1 Apr. 30, 2009

Related U.S. Application Data

(60) Provisional application No. 60/982,749, filed on Oct. 26, 2007.

(51) Int. Cl.
*H04L 27/06* (2006.01)
(52) U.S. Cl. ..................................................... 375/340
(58) Field of Classification Search .................. 375/259, 375/316, 324, 340; 379/387.02; 324/607; 341/126, 127, 128, 155, 156, 159
See application file for complete search history.

(56) References Cited

U.S. PATENT DOCUMENTS

| 6,985,714 B2 * | 1/2006 | Akiyama et al. ............... 455/402 |
| 2005/0083925 A1 | 4/2005 | Bonicatto et al. |
| 2008/0049744 A1 * | 2/2008 | Kim et al. ...................... 370/389 |

FOREIGN PATENT DOCUMENTS

| WO | 2006126738 A | 11/2006 |
| WO | 2006135081 A | 12/2006 |

OTHER PUBLICATIONS

Office Action dated Jan. 21, 2011, Swedish Patent Application No. 1050207-8; "Programmable Signal Slicer," pp. 1-7 (no translation available).

* cited by examiner

*Primary Examiner* — Sam K Ahn
(74) *Attorney, Agent, or Firm* — Kilpatrick Townsend & Stockton LLP

(57) ABSTRACT

Disclosed are various embodiments of a programmable slicer in a digital signal processing system and/or software radio system. In one embodiment, a plurality of demodulation schemes and a plurality of channel definitions are stored in a channel allocation table. An analog waveform is received and converted into at least one digital waveform. A specified frequency range is isolated from the at least one digital waveform. The magnitude of tones within the specified frequency range is measured and stored in a signal magnitude table. Symbols and/or bits are decoded from the signal magnitude table by applying a demodulation schemes and channel definitions to the magnitudes stored in the signal magnitude table.

29 Claims, 8 Drawing Sheets

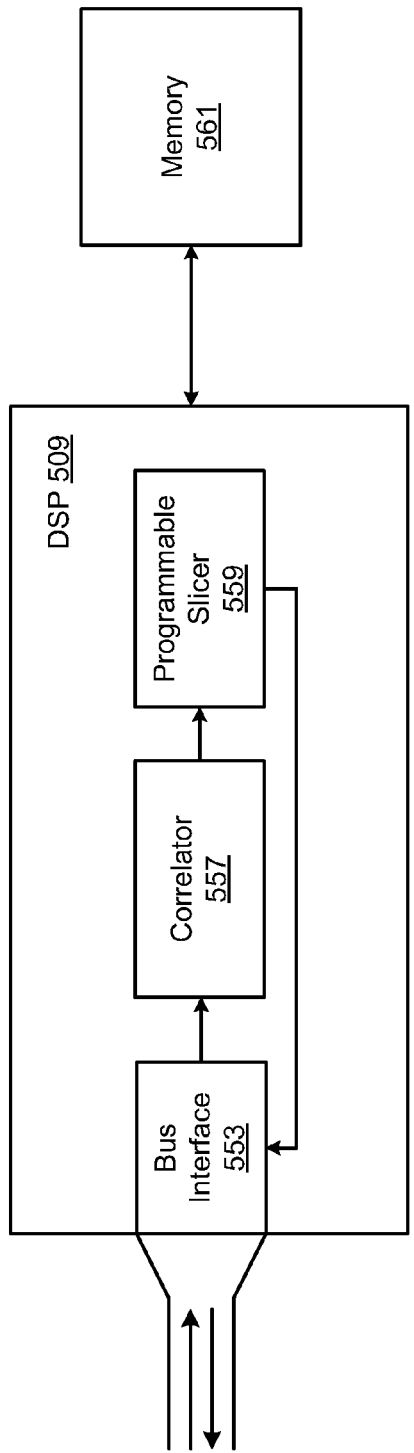
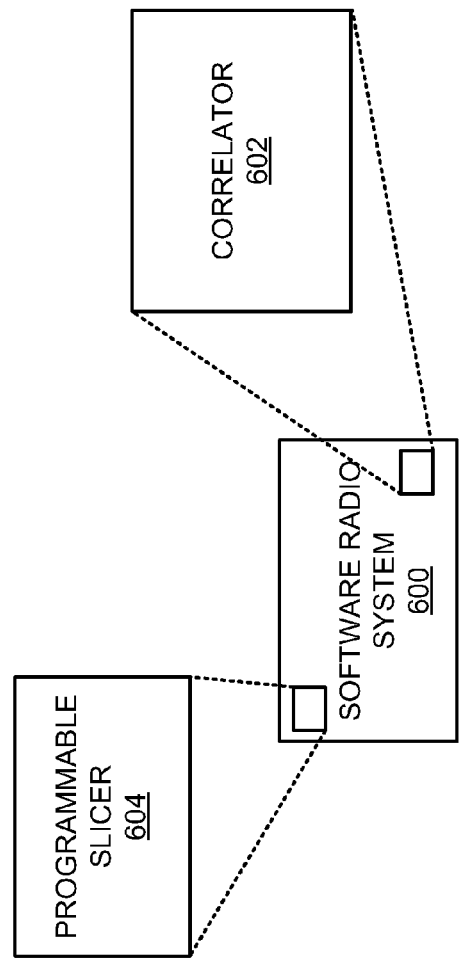

US 8,144,816 B2

PROGRAMMABLE SIGNAL SLICER

CROSS REFERENCE TO RELATED APPLICATION

This application claims priority to U.S. Provisional Application Ser. No. 60/982,749, filed Oct. 26, 2007, which is hereby incorporated by reference herein in its entirety.

TECHNICAL FIELD

The disclosure relates generally to a power distribution system, and more specifically, to communications over distribution lines in a power distribution system.

BACKGROUND

In a power distribution system, usage metering data may be transmitted over a distribution line or a communications link to a power distribution substation, central office, billing center, or the like. Various modulation schemes may be employed between an endpoint and a distribution substation, central office, billing center, or the like.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 5 depicts an exemplary embodiment of a digital signal processor implementing a programmable slicer and/or correlator;

FIG. 6 depicts a functional block diagram of a software radio system implementing a programmable slicer and/or correlator;

DETAILED DESCRIPTION

Disclosed are systems and methods for a programmable and dynamically configurable slicer in a software radio system. The programmable slicer facilitates the use of multiple modulation schemes with respect to a carrier wave on which digital data is encoded. The programmable slicer allows various transceivers and/or endpoints in a system to communicate with other endpoints in a system using various modulation schemes.

A system including the programmable slicer demodulates a carrier wave using various demodulation schemes that can be dynamically changed and/or configured. As a non-limiting example, the programmable slicer can allow an endpoint to communicate with another endpoint via a carrier wave encoded using a binary frequency shift keying modulation scheme. The endpoint may then communicate with another endpoint in the system using a 32 tone (e.g., 5 bit) frequency shift keying modulation scheme that is linked with a symbol lookup table stored in a memory in order to determine the data being transmitted. Accordingly, this flexibility facilitates various software radio applications, as endpoints equipped with a programmable slicer in accordance with an embodiment of the disclosure can also communicate with other endpoints at various speeds and bandwidth utilization levels.

Figure 1:
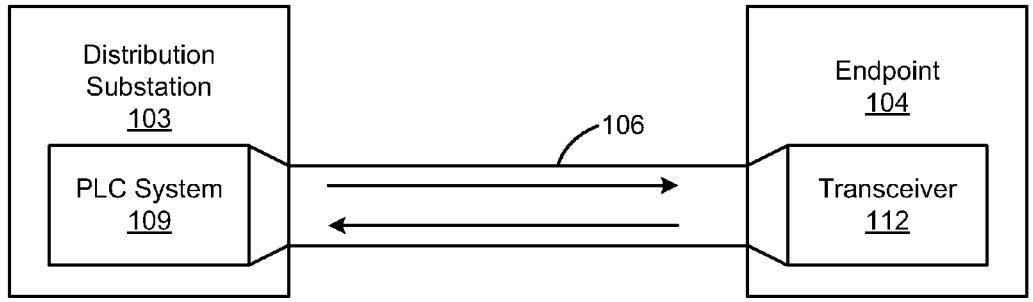
FIG. 1 depicts a distribution substation and an endpoint according to an embodiment of the disclosure.

Therefore, with reference to FIG. 1, shown is a block diagram of one link of an exemplary power distribution system 100 distributing power between a distribution substation 103 and an endpoint 104, which can be incorporated with a customer device and/or electrical system at a power consumer's premises or site. The power distribution system 100, or distribution plant as it is sometimes referred to, can be that part of an electric power system that receives power from a power generator via high-voltage transmission lines, reduces or steps down the voltage, and then distributes the power to an endpoint 104 at the premises of a power consumer. Within the power distribution system 100, distribution lines may conduct electricity from the distribution substation to the endpoints. Distribution lines may include underground cable, aerial cable, or overhead open-wire conductors carried on poles, or some combination thereof.

Depending on the particular configuration, there may be one or more layers of distribution substations 103 connected in series between the power generator and the endpoint 104, where each consecutive distribution substation further steps down the voltage of the electricity being transmitted. Additionally, the depicted distribution substation 103 can also represent any other central office, data center, and/or other supplier infrastructure used to deliver electricity, telecommunications services, phone, internet, or other services. As a non-limiting example, the depicted distribution substation 103 can be replaced and/or supplemented with a digital subscriber line access multiplexer (DSLAM) implemented in accordance with the same or analogous principles as disclosed herein.

Additionally, the power generators, distribution substations 103, and endpoints 104 may be organized in a network where the various power generators supplying power can be taken on or off line and the distribution substation (through which a particular endpoint receives its electricity) can be changed without a loss or interruption of power. Distribution transformers (not shown) may be connected in the distribution line between the distribution substation 103 and the endpoint 104, which the distribution transformers serve to further step-down the voltage to a level that is used by consumers. These step-down transformers, often referred to as pole transformers may be configured to supply a consumer or group of consumers with electricity over a secondary circuit. Each consumer may be connected to the secondary circuit through its service leads and meter.

The distribution substation 103 shown in FIG. 1 may be configured to provide power to a consumer device (not shown) and/or endpoint 104 via a distribution line 106. The distribution line 106 may be coupled to one or more step-down transformers before reaching the depicted endpoint 104. The distribution line 106 may be configured to receive power from the distribution substation 103 and provide at least a portion of that power to the endpoint 104.

For a variety of reasons, it may be desirable to communicate information from the distribution substation 103 to one or more endpoints, such as the endpoint 104. As a non-limiting example, it may be desirable to control and/or monitor a usage metering device, which may be located at or near the endpoint 104 to determine the power consumption at the endpoint 104. Additionally, control information may be configured to provide the ability to control and/or alter the operation of the usage metering device and/or individual loads at the customer premise. As an additional non-limiting example, other services aside from power, such as telecommunications, internet, and/or other data services can also be provided via the distribution line and may utilize bi-directional communication between the distribution substation 103 and endpoint 104.

Other more general information, including, but not limited to, information to display or store the price of power at the customer premise, the date and time, the temperature and/or other information capable of being received and translated at the customer premise may also be transmitted along the distribution line. As a non-limiting example, the time displayed on an electronic device at the customer premise could be periodically adjusted to display an accurate time as transmitted by the utility station.

As three phase electronic power systems can be frequently employed for power distribution, such power systems can include three conductors carrying time offset waveforms. Accordingly, data can be transmitted via three substantially similar waveforms that can be reconciled by a transceiver, and/or data can be separately transmitted in each of the three waveforms. It should also be appreciated that a single phase waveform or combinations of any number of wave forms can be employed as well. Data can be embedded in any or all of the waveforms by employing various modulation schemes, which can include, but are not limited to: frequency-shift keying (FSK), on-off keying, amplitude shift keying, phase shift keying, quadrature amplitude modulation, minimum shift keying, continuous phase modulation, pulse position modulation, trellis modulation, and orthogonal frequency division multiplexing or other modulation schemes that should be appreciated whereby digital information can be transmitted on any or all of the waveforms employed in a power distribution system that may act as a carrier wave in such a scheme.

Various embodiments disclosed herein may be configured to communicate control signals and general information signals to endpoints 104 via the distribution line 106 to control customer devices and provide more general information to the customer. Information from the customer device also may be sent via the distribution line 106 to the distribution substation 103, thereby creating a two-way or bidirectional communications link via the distribution line 106. The aforementioned examples of control signal applications where control signals (and/or general information signals) are provided by the distribution substation to an endpoint 104 are merely representative of the various uses that such control signals provide. Therefore, the examples provided herein are merely exemplary, as the disclosed embodiments are not limited to the transmission of any particular signal or service.

In providing control information and/or other data at the distribution substation 103, a power line carrier (PLC) transceiver 109 is used to drive control signals and/or other data along the distribution line 106 to an endpoint transceiver 112 at the endpoint 104. The endpoint transceiver 112 may be configured to recognize the signals transmitted by the PLC transceiver 109. Similarly, the PLC transceiver 109 may be configured to receive information transmitted on the distribution line 106 from the endpoint transceiver 112.

The power distribution system 100 including the distribution line 106 may be configured to provide a full-duplex or bidirectional link between the distribution substation 103 and the endpoint 104. Full duplex in this non-limiting example may refer to simultaneous (and/or substantially simultaneous) communications in both directions, although the information sent in one direction may travel at a speed different from that of the information provided in the opposite direction. This full-duplex link via the distribution line 106 may be configured to provide for transmission of control information, without the need for additional wiring over and above such a distribution line 106 that may be utilized for the transmission of electrical power.

It should be appreciated that the depicted power distribution system 100 of FIG. 1 is merely a depiction of a single exemplary link in such a system. It should further be appreciated that additional complexities utilized for the bulk distribution of electricity or other services can be incorporated into an embodiment of the present disclosure. It should also be appreciated that systems and methods disclosed herein may not be limited to use in a power distribution system 100, and that the depicted power distribution system 100 is but one example in which embodiments of the disclosure can be implemented. For example, systems and methods of an embodiment can be implemented in a software radio system other system employing a carrier wave and/or multiple modulation/demodulation schemes. Additional non-limiting examples are discussed herein.

Figure 2:
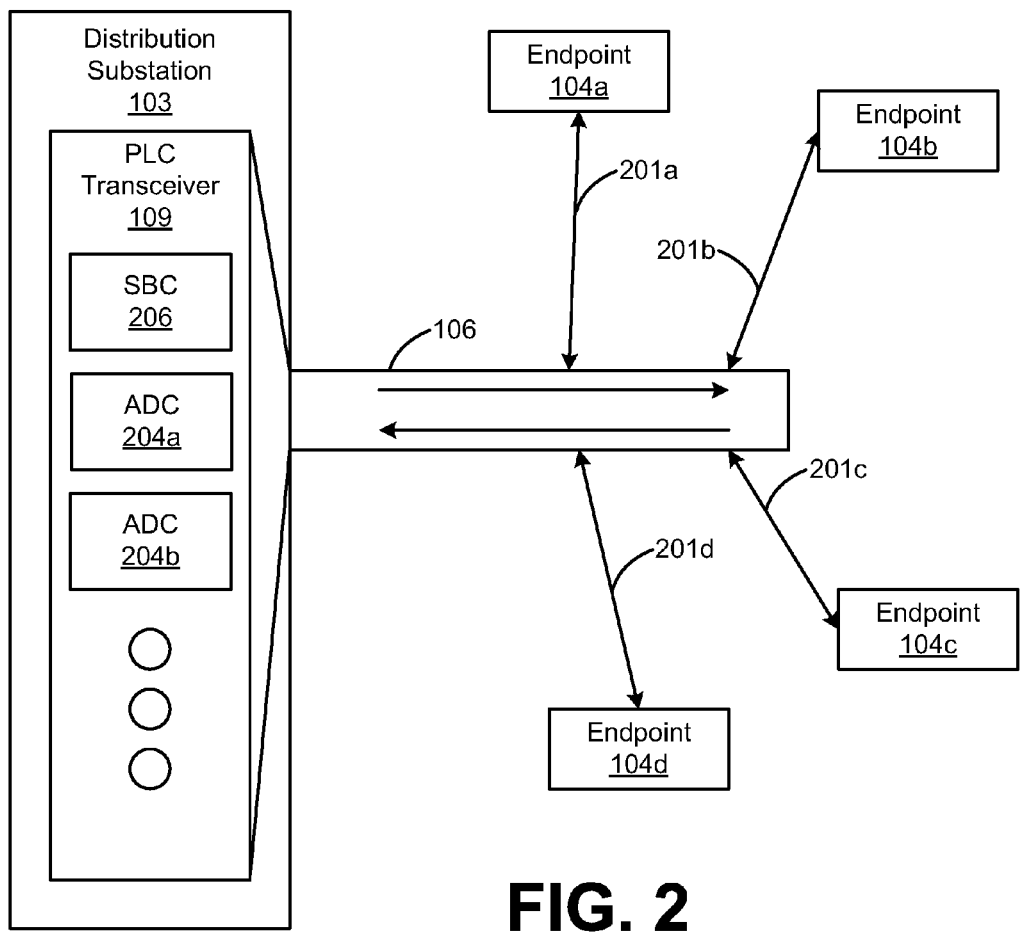
FIG. 2 depicts another exemplary embodiment of a distribution substation and multiple endpoints.

With reference to FIG. 2, shown is an alternative depiction of a distribution substation 103 in accordance with the disclosure. It should be noted, as is depicted in FIG. 2, that in operation, a distribution substation 103 can be coupled to more than one endpoint 104. As a non-limiting example, a distribution substation 103 may be coupled to hundreds or thousands of endpoints 104 configured in a unidirectional or bidirectional communications link over a distribution line 106. It should also be noted that in a multiple endpoint 104 configuration, various wiring configurations can be employed to connect a distribution substation 103 to endpoints 104. As a non-limiting example, in the depicted environment of FIG. 2, a main distribution line 106 as well as various spoke distribution lines 201 are employed to connect endpoints 104 to the distribution substation 103. However, alternative wiring schemes may also be employed. As an additional non-limiting example, the distribution substation 103 as well as endpoints 104 may be connected serially.

As the distribution substation 103 and multiple endpoints 104 can be configured to form a communication link therebetween via distribution line 106, a communications protocol can be established to substantially ensure that signals originating from one endpoint 104a do not interfere with those originating from another endpoint 104b. Accordingly, each endpoint 104 in such an environment can be assigned a channel in a frequency modulation scheme in which it may transmit data. As a non-limiting example, an endpoint 104 can be assigned an approximate 2-3 mHz channel within approximately 50 Hz to 60 Hz of bandwidth that is typically employed for power distribution.

Accordingly, the PLC transceiver 109 can communicate with each endpoint 104 individually by sending and/or receiving signals in a particular channel or frequency assigned to an endpoint 104. As noted above, there may be hundreds or thousands of endpoints 104 coupled to a distribution substation 103. A PLC transceiver 109 in accordance with embodiments of this disclosure are capable of interpreting and processing data that may be sent from multiple endpoints 104. Such processing of a three phase analog waveform can utilize substantial digital signal processing resources. Accordingly, the PLC transceiver 109 may include at least one advanced digital signal processing card (ADC) 204, which is configured to receive the three offset phases of a three phase signal from various endpoints 104 that are coupled to the distribution substation 103 or a subset thereof. The ADC 204 may be configured to receive, filter, and/or separate a predetermined frequency range (e.g. approximately a 60 Hz and/or 50 Hz range) into one or more channels that are assigned to various endpoints 104.

In one embodiment, the ADC 204 can include one or more digital signal processors that are configured to receive and/or process channels assigned to endpoints 104 that are encoded in an analog waveform. A programmable slicer can be implemented in one or more digital signal processors on an ADC 204. In addition, a correlator can also be implemented to facilitate demodulation of a signal by the programmable slicer. As another non-limiting example, an ADC 204 can include a plurality of digital signal processors that can receive the various phases of a waveform embedded with encoded data from a plurality of endpoints 104 and extract at least one channel of data corresponding to the various endpoints 104 in an environment such as depicted in FIG. 2. As the communications theories employed to extract such channels of digital data from an analog waveform by employing various modulation/demodulation schemes should be appreciated by one of ordinary skill in the art, further detail need not be discussed herein.

A PLC transceiver 109 can further include one or more ADC's 204 to perform digital signal processing to receive and/or process signals received from other and/or additional endpoints 104. As a non-limiting example, the distribution substation 103 and PLC transceiver 109 may be coupled to a number of endpoints 104 that is greater than can be handled by a single ADC 204; therefore, additional ADCs 204 may be incorporated into a PLC transceiver 109.

A PLC transceiver 109 may further include a single board computer (SBC) 206 and/or other device that can handle higher level tasks of a distribution substation 103 aside from the digital signal processing operations of the ADC's 204. As a non-limiting example, the SBC 206 may be configured to receive digital signals extracted by the ADC's 204 corresponding to each endpoint 104 coupled to a distribution substation 103. Such data can include, but is not limited to: metering data, outage data, status information and other data. Accordingly, the SBC 206 can process such data for billing, maintenance or other purposes. As an alternative non-limiting example, SBC 206 can forward such data to central billing and/or operations systems for such processing.

Additionally, SBC 206 can issue commands to ADC's 204 of the PLC transceiver 109. As a non-limiting example, an SBC 206 can configure digital signal processing resources of an ADC 204 by initiating a software flash and/or other programming processes of one or more digital signal processors or other programmable components residing on an ADC 204. As another example, an SBC 206 can configure a programmable slicer implemented in the digital signal processing resources of an ADC 204 by updating and/or modifying the modulation schemes and/or channel allocation configuration under which a distribution substation 103 and various endpoints 104 communicate.

Figure 3:
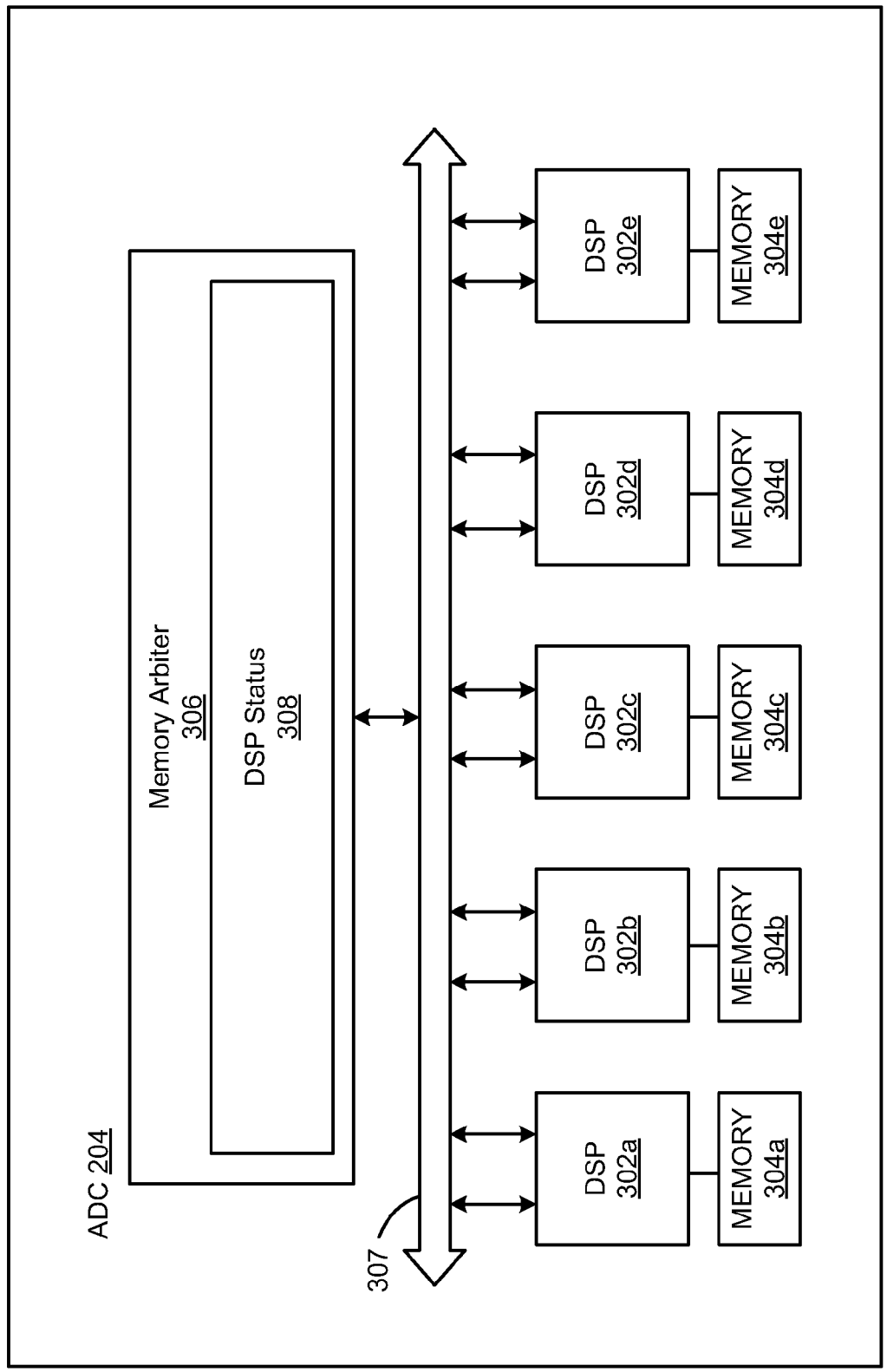
FIG. 3 depicts an exemplary embodiment of an advanced digital signal processing card.

Reference is now made to FIG. 3, which depicts a non-limiting exemplary embodiment of an ADC 204 in which a programmable slicer can be implemented. The depicted ADC 204 includes multiple digital signal processors 302 that are coupled to a corresponding memory 304. One or more of the digital signal processors 302 may be configured to act as a programmable slicer for receiving and processing data from various endpoints 104 (FIG. 1) in a power distribution system. Additionally, each digital signal processor 302 may possess an internal memory or can be configured with an external memory for the purpose of assisting with the digital signal processing of signals received from a distribution line 106 (FIG. 1).

Because various digital signal processing tasks may be divided in the ADC 204 among the digital signal processors (DSPs) 302, the various digital signal processors 302 may also be configured to communicate data among one another. As a non-limiting example, if the DSPs 302 of an ADC 204 are configured to perform piecewise processing of a signal in an assembly line fashion in order to isolate channels embedded therein, it may be desired to transmit data from one DSP (e.g. 302a) to another DSP (e.g. 302b) in the ADC 204. Consequently, the DSPs 302 of the ADC 204 can transmit data among one another to facilitate digital signal processing necessary to process signals on a distribution line 106.

Therefore, in order to implement a programmable slicer and correlator in accordance with an embodiment of the disclosure, one or more DSPs 302 in the depicted ADC 204 can be configured to process a signal received by the ADC 204. To facilitate processing of a signal, the digital signal processors 302 may be configured to access the memory 304 of other digital signal processors 302 in an ADC 204. As a non-limiting example, the DSP 302a can be configured to access the memory 304b that is coupled to the DSP 302b. Such access can include writing and/or reading data from or to the memory 304b. In the above non-limiting example, the DSP 302a is configured to act as a master processor with reference to the DSP 302b, as it has access to the memory of the DSP 302b. Additionally, the DSP 302b can be likewise configured to access the memory 304a that is coupled to DSP 302a. Therefore, DSPs 302a and 302b (or any of the DSPs in the ADC 204) can be configured as a master processor and a slave processor by accessing memory of another DSP while substantially simultaneously providing access to its own memory.

As an additional non-limiting example, DSP 302a may be configured as a master processor relative to DSP 302b and a slave processor relative to a third DSP, such as DSP 302c. Whether a DSP requires configuration as a master processor and/or a slave processor relative to another DSP may be dependent on configuration or programming of the DSPs and the tasks performed by each in order to process a waveform in a power distribution system or other software radio application. In other words, each DSP 302 in an ADC 204 can be configured to act as a master processor and/or a slave processor relative to any other DSP 302 in the system. In addition, a DSP configured as a slave processor relative to a first DSP may not be simultaneously configured as a slave processor relative to a second DSP. In other words, a master processor should have exclusive access to the memory of a slave processor relative to other potential master processors in the system.

Because each DSP 302 of the ADC 204 can be configured as a master processor or a slave processor relative to any other DSP 302 in the system, fabrication of such a system can be facilitated with the use of a memory arbiter 306 that can arbitrate and/or route such requests and data transfers among the DSPs 302. Rather than wiring individual DSPs 302 to one another directly, the ADC 204 employs memory arbiter 306 and bus 307 to facilitate the flexible master-slave architecture of the ADC 204 disclosed herein. To this end, the memory arbiter 306 maintains DSP status 308, which, for at least one of the DSPs 302 in an ADC 204, includes data regarding whether a DSP is presently claimed as a slave processor by another DSP in the ADC 204. In other words, if a particular DSP 302 is claimed as a slave processor, the DSP can cause the memory arbiter 306 to reflect that it is presently exclusively claimed as a slave processor by another DSP acting as a master processor. Additionally, the DSP status 308 includes data regarding which DSP 302 in the ADC 204 has exclusively claimed a DSP as a slave processor. The above non-limiting example of an ADC 204 in which a programmable slicer and/or correlator can be implemented is merely exemplary and other permutations of DSPs or any computing system or resources can be employed.

Figure 4:
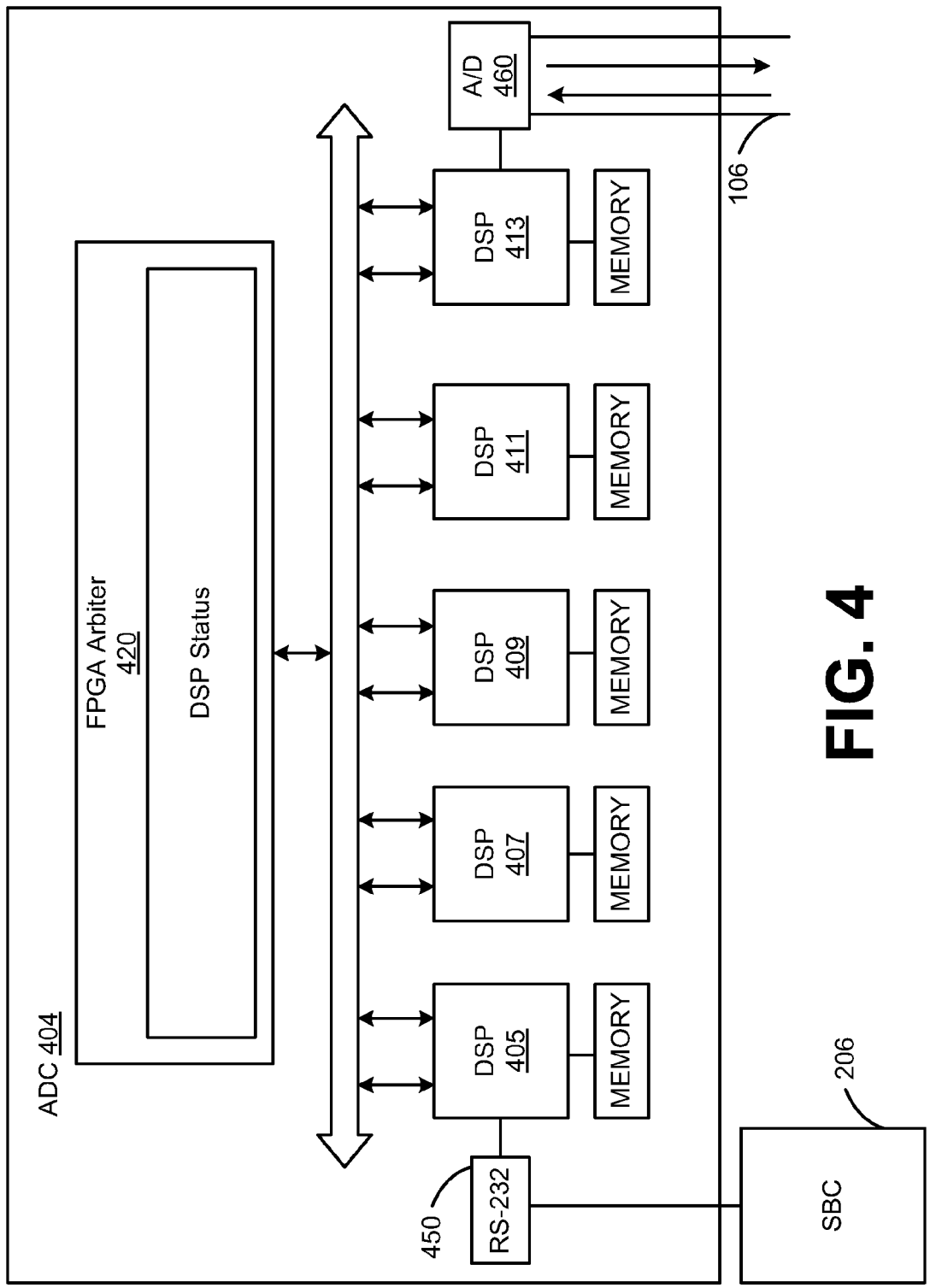
FIG. 4 depicts an alternative illustration of an advanced digital signal processing card.

Reference is now made to FIG. 4, which depicts an alternative illustration of an advanced digital signal processing card (ADC) 404. The depicted ADC 404 illustrates one non-limiting example of an implementation in a power distribution system 100 (FIG. 1), whereby the ADC 404 divides processing tasks necessary to receive and process a signal. As noted above, the ADC 404 can be configured to process a waveform having data from various endpoints in a power distribution system 100 embedded thereon. Because such a power distribution system may have hundreds or thousands of endpoints in communication with an ADC 404 residing in a distribution substation 103 and/or PLC transceiver 109, considerable digital signal processing tasks may be required in order to extract data from such a number of endpoints that can potentially transmit data embedded in a three phase waveform.

In the depicted non-limiting embodiment DSP 405 is configured to communicate with an RS-232 interface 450 with an SBC 206 that can be in a PLC transceiver 109. As noted above, the SBC 206 can perform various functions such as communicating with a central billing system, issuing commands and/or other directives to the ADCs in a PLC transceiver 109, and other tasks. In addition, the SBC 206 can configure and/or program the ADC 404 as well as the DSPs (405-413) and memory arbiter 420 residing thereon. This configuration and/or programming which can include issuing new software for flashing on a hardware device, information regarding endpoints, distribution line 106 conditions, modulation/demodulation schemes for a programmable slicer, channel allocations for a programmable slicer, and other data. It should also be noted that the DSP 405 may communicate with the SBC 206 via interfaces other than RS-232 interface 450, which may include, but are not limited to Ethernet or other serial and/or parallel data interfaces.

Accordingly, DSP 405 may be configured to act as a gateway to the SBC 206 for the ADC 404 as well as other hardware and software components thereon. Consequently, the DSP 405 may be configured to understand and/or execute a command set or other protocol necessary for such gateway communications. Additionally, the DSP 405 is further configured to translate and/or forward commands or data from the SBC 206 to other DSPs in the ADC 404, which can include but is not limited software to execute in the memory or flash memory of a DSP (405-413) or configuration data. Accordingly, DSP 405 may be configured to use the master-slave architecture facilitated by the memory arbiter 420 that allows it to claim other DSPs (407-413) in the ADC 404 as slave processors for the purpose of accessing memory of the DSPs (407-413). In addition, the DSP 405 can transmit digital data extracted from various channels of a waveform received on a distribution line 106 or any other communication line to the SBC 206 via the RS-232 interface 450.

DSP 413 in the depicted ADC 404 is configured to receive a waveform on a distribution line 106 that is converted into digital signals by an analog to digital converter (A/D) 460. In the case of a three phase waveform, the A/D 460 is configured to receive three phases and convert the phases into a digital signal for processing by the ADC 404. The DSP 413 can perform digital signal processing tasks to begin the channel extraction process. As a non-limiting example, the DSP 413 can combine the three phases of the three phase waveform and filter the combined waveform such that extraneous data at frequencies above and below an area of interest are removed. As a non-limiting example, in a 60 Hz power distribution system, frequencies above and below a 60 Hz area of interest can be filtered from the combined waveform by DSP 413 so that channels can be extracted therefrom. Likewise, the same principle can be applied in a 50 Hz power distribution system, as frequencies above and below a 50 Hz area of interest can be filtered from the combined waveform. In this way, DSP 413 can perform such pre-processing so that additional DSPs in the ADC 404 can further process the waveform to extract data from channels corresponding to endpoints in a power distribution system.

In the depicted example, one or more of the remaining DSPs in the ADC 404 can implement a correlator and/or programmable slicer to extract data from channels in a waveform preprocessed by DSP 413. The correlator can measure various characteristics of tones in a preprocessed waveform and store the characteristics of each tone in a table. These characteristics can include, but are not limited to the amplitude, phasing, frequency, and other characteristics that should be appreciated. In one embodiment, the correlator can measure the magnitude and/or amplitude of each tone in a preprocessed waveform and store the magnitudes and/or amplitudes in a signal magnitude table that can be stored in a corresponding DSP memory. A programmable slicer can process the signal magnitude table to extract bits and/or symbols encoded in the waveform that correspond to various channels of the waveform.

The programmable slicer can employ various demodulation schemes and channel configurations that can be stored and/or retrieved from a DSP memory in a channel allocation table or other data structure. As a non-limiting example, the channel allocation table can define a first channel as including a "zero" tone, a "one" tone, and a guard tone. In the above example, the channel allocation table can further associate a demodulation scheme such as binary frequency shift keying with the channel definition so that the programmable slicer can extract a bit and/or symbol from the first channel. Accordingly, in the example of the first channel noted above, the programmable slicer can determine whether a "zero" or "one" is encoded therein by examining the signal magnitude table by determining whether the "zero" tone or "one" tone has a greater magnitude in the signal magnitude table.

To further demonstrate the operation of the programmable slicer, in the above non-limiting example, the channel allocation table can define a second channel in a channel definition as including 32 tones. In addition, the channel allocation table can define a demodulation scheme associated with the 32 tone channel. As a non-limiting example, the demodulation scheme can instruct the programmable slicer to determine which of the 32 tones has the greatest magnitude and/or amplitude by examining the signal magnitude table. The programmable slicer can subsequently retrieve a symbol associated with the tone from a symbol table associated with the channel and/or demodulation scheme. For example, if the third tone has the greatest magnitude, the programmable slicer can determine that data in a symbol table associated with the third tone is associated with the second channel of the waveform.

Additionally, the programmable slicer can determine a plurality of tones that have the greatest magnitude and/or amplitude relative to other tones in a channel and assign a value and/or symbol based on the identity of such tones. Further, as noted above, the correlator may populate the signal magnitude table with values corresponding to other characteristics of a tone, which can include, but are not limited to: phase/phasing, amplitude, frequency and other characteristics which should be appreciated. Accordingly, the programmable slicer can assign a value to a channel based on any values populated in the signal magnitude table, and may operate according to a demodulation scheme instructing the programmable slicer to examine one or a plurality of values in the table.

The above scenario is merely exemplary, and is given to demonstrate the configurability and flexibility of the programmable slicer in that it is capable of decoding a signal that may have various modulation/demodulation schemes associated with various channels. The above scenario is further discussed with reference to FIG. 8. Other demodulation schemes can be employed as noted above, which can include QAM, FSK, MFSK, BPSK, CPFSK, MPSK, differential phase schemes such as DPSK, modulation schemes using phasing as an information carrier such as PSK, and others as can be appreciated. It should be appreciated that the programmability of the slicer allows a signal to be decoded that includes multiple types of modulation of a given signal. The programmable slicer may also be employed with schemes involving coherent and non-coherent detection.

Accordingly, the DSP 413 can employ the master-slave architecture to send the filtered data to one or more of the remaining DSPs 407, 409, 411 to perform the correlator and/or programmable slicer functions in order to extract data corresponding to endpoints. As there may be hundreds or thousands of endpoints in a power distribution system, the DSPs 407, 409, 411 may be assigned various distinct portions of the filtered waveform received from DSP 413 to extract such data. As a non-limiting example, an endpoint can be assigned a channel representing a subset of a total bandwidth in order to transmit data using a first modulation scheme. For certain periods or data transmission scenarios, the endpoint can be assigned a larger or smaller channel of the total bandwidth to transmit data using a different modulation scheme. In this way, the system allows dynamic apportionment of available bandwidth of the transmission medium among endpoints on an as needed basis. Therefore, the programmable slicer and correlator allows decoding of data from an endpoint using common hardware and software, as the slicer is capable of handling various channel sizes and modulation schemes as defined by the channel allocation table.

With reference to FIG. 5, shown is one example of a DSP 509 according to one embodiment of the disclosure. The depicted DSP 509 can exist in an ADC 404 (FIG. 4) or in any computing system, or as a standalone signal decoder. The DSP 509 can include a bus interface 553 that provides access to a data bus, shared memory system, master processor, slave processor, transmission line, communication medium, or other external resources. The DSP 509 can further be configured with a correlator 557 and a programmable slicer 559. The DSP 509 can also optionally be configured with a dedicated memory 561 structure in which channel allocation tables, signal magnitude tables, or other data structures can be stored and/or accessed.

The correlator 557 is configured to preprocess a data signal on behalf of a programmable slicer 559. In one embodiment, the correlator 557 can detect the magnitude and/or energy level of various tones in a waveform and store the magnitudes in a signal magnitude table. Accordingly, as described above, the programmable slicer 559 can decode the various channels encoded in the waveform by processing the signal magnitude table according to a channel allocation table that contains channel definitions and demodulation schemes associated with the various channel definitions.

Reference is now made to FIG. 6, which depicts a functional block diagram of a software radio system 600. It should be noted that some components not essential for understanding (by persons skilled in the art) of the software radio system 600 are omitted for purposes of brevity and ease of depiction. The software radio system 600 can be implemented as a software program in a computing system for the purposes of transmitting and/or receiving data signals encoded in one or more waveforms.

The software radio system 600 can include a correlator 602 and programmable slicer 604. As described above with reference to previously disclosed embodiments of the disclosure, the correlator 602 is configured to preprocess a data signal on behalf of a programmable slicer 604. In one embodiment, the correlator 602 can detect the magnitude and/or energy level of various tones in a waveform and store the magnitudes in a signal magnitude table. Accordingly, as described above, the programmable slicer 559 can decode the various channels encoded in the waveform by processing the signal magnitude table according to a channel allocation table that contains channel definitions and demodulation schemes associated with the various channel definitions.

Figure 7:
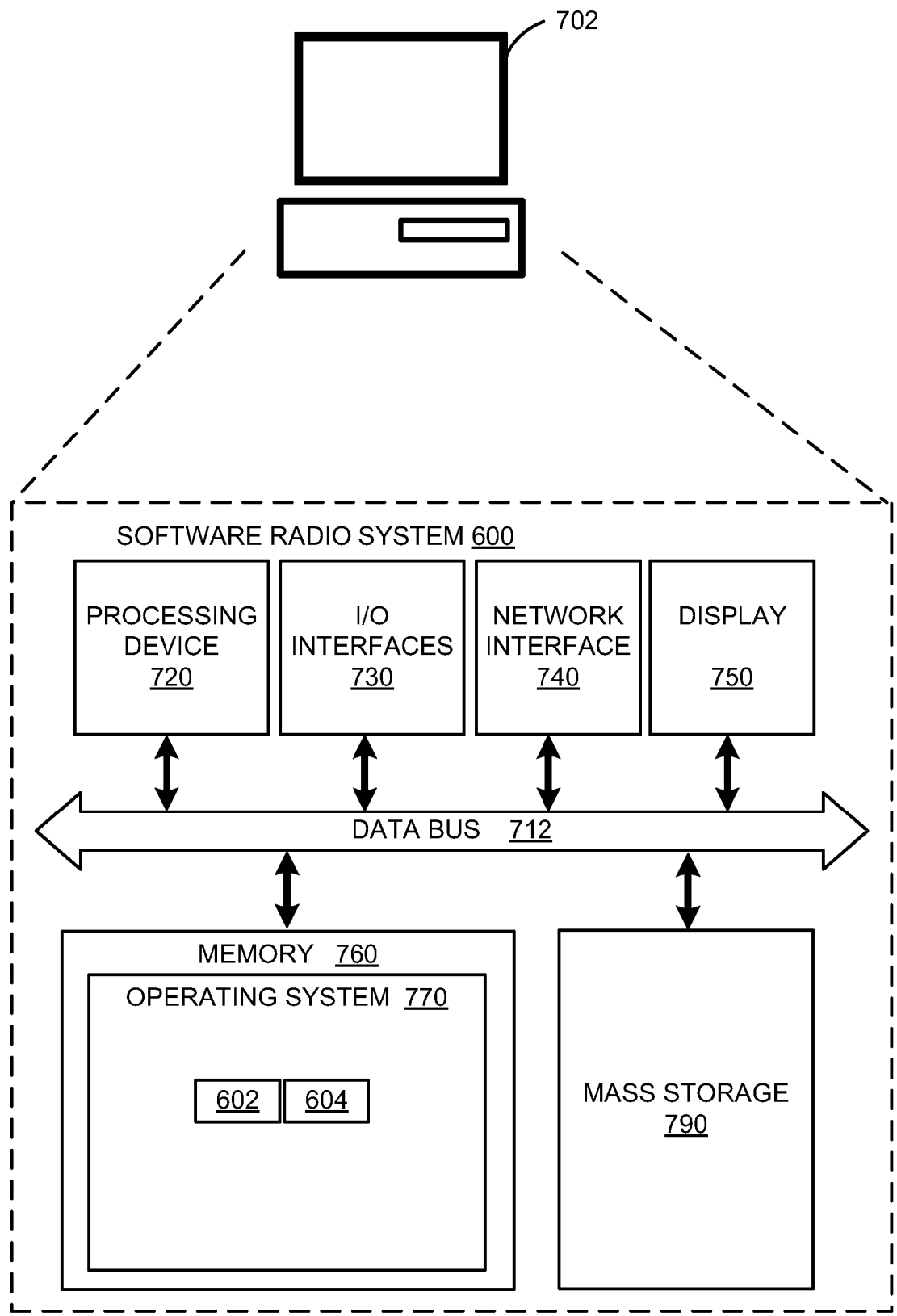
FIG. 7 depicts a functional block diagram of a software radio system implementing a programmable slicer and/or correlator.

Reference is now made to FIG. 7, which is an exemplary embodiment of the software radio system 600 from FIG. 1. For some embodiments, the software radio system 600 may be incorporated as some type of computing device. Generally speaking, the software radio system 600 may be any one of a wide variety of wired and/or wireless computing devices, such as an embedded system, digital signal processing system, desktop computer, portable computer, dedicated server computer, multiprocessor computing device and so forth. Irrespective of its specific arrangement, the software radio system 600 may comprise, among other components, a processing device 720, input/output interfaces 730, a network interface 740, and, optionally, a display 702 connected across a data bus 712. One of ordinary skill in the art will appreciate that the software radio system 600 can, and typically will, comprise other components, which have been omitted for purposes of brevity.

The processing device 720 can include a custom-made or commercially available processor, a central processing unit (CPU) or an auxiliary processor among several processors associated with digital signal processing, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 760 shown in FIG. 7 can include any one of a combination of volatile memory elements (e.g., random-access memory RAM, such as DRAM, and SRAM, etc.) and nonvolatile memory elements (e.g., ROM, hard drive, tape, CDROM, etc.). The memory 760 may store a native operating system 370, one or more native applications, emulation systems, or emulated applications for any of a variety of operating systems and/or emulated hardware platforms, emulated operating systems, etc. Again, one of ordinary skill in the art will appreciate that the memory 760 can, and typically will, comprise other components, which have been omitted for purposes of brevity. The software radio system 600 may further comprise mass storage 790. The mass storage 790 may be, for example, a disk drive, flash memory, or any other of a wide variety of storage devices capable of storing data.

As noted in the functional block diagram of FIG. 6, the software radio system 600 may include a correlator 602 and programmable slicer 604, the functionality of which are described herein. When implemented in software, it should be noted that any of the above modules can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

Input/output interfaces 730 comprise any number of interfaces for the input and output of data. For example, where the software radio system 600 comprises a personal computer, the components within the system may interface with a user input device such as a keyboard, a mouse, or a remote controller. In addition, the software radio system 600 may communicate via the input/output interfaces 730 with an antenna, radio system, communication line, or other communication medium for the purposes of receiving and/or sending a data signal. The software radio system 600 may also include a network interface 740 for transmitting and/or receiving data over a network. As a non-limiting example, the network interface 740 may include a modulator/demodulator (e.g., a modem), wireless (e.g., radio frequency (RF)) transceiver, a telephonic interface, a bridge, a router, network card, etc.

Figure 8:
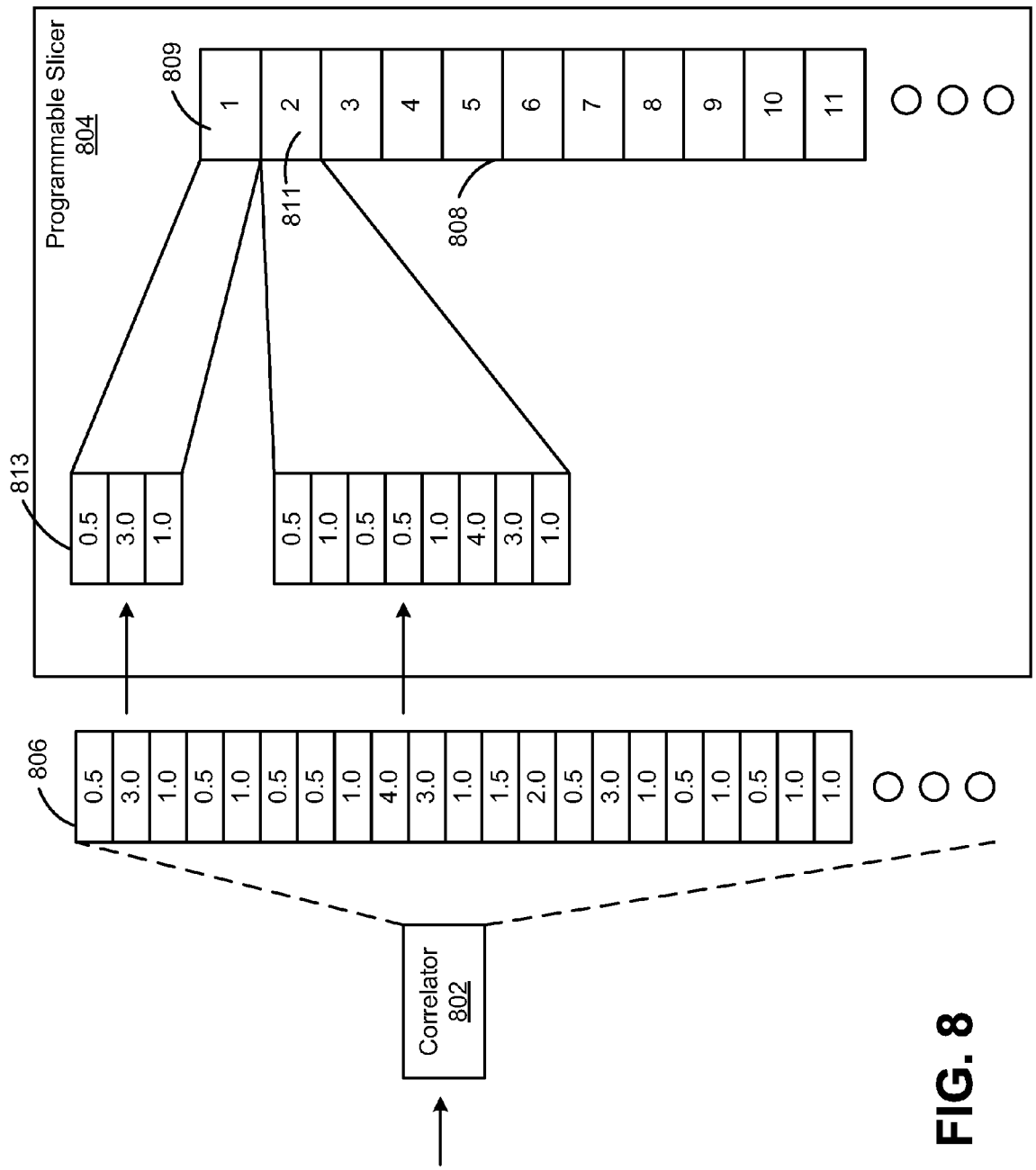
FIG. 8 is an alternative depiction of a programmable slicer and correlator.

With reference to FIG. 8, shown is an alternative depiction of a correlator 802 and programmable slicer 804 in accordance with an embodiment of the disclosure. As noted above, the correlator 802 is configured to measure the magnitude of tones of a carrier wave and store the magnitude of each tone (or a subset thereof) in a signal magnitude table 806. The programmable slicer 804 can be configured to decode a signal encoded in the carrier wave by examining the signal magnitude table 806. To that end, the programmable slicer 804 can employ a channel allocation table 808, which can be stored in memory accessible by the programmable slicer 804. The channel allocation table 808 can define a plurality of channels embedded in a carrier wave. In the depicted non-limiting example, a first channel 809 can include a first series of tones 813 that include binary frequency shift keyed tones that can include a "zero" tone, a "one" tone, and a "guard" tone. The programmable slicer 808 can determine which of the "zero" tone and "one" tone has a greater magnitude as defined by the signal magnitude table. In the depicted example, because the "one" tone is greater than the "zero" tone, the programmable slicer can extract a "one" bit and/or symbol from the first channel 809.

Continuing the above example, a second channel 811 can define a series of eight frequency shift keyed tones. The second channel 811 can include a demodulation scheme instructing the programmable slicer 804 to assign a symbol and/or bit associated with the tone having the greatest magnitude. It should again be noted that the above scenario is merely exemplary, and is given to demonstrate the configurability and flexibility of the programmable slicer in that it is capable of decoding a signal that may have various modulation/demodulation schemes associated with various channels. Other demodulation schemes can be employed as noted above, which can include QAM, FSK, MFSK, BPSK, CPFSK, MPSK, differential phase schemes such as DPSK, modulation schemes using phasing as an information carrier such as PSK, and others as can be appreciated. It should be appreciated that the programmability of the slicer allows a signal to be decoded that includes multiple types of modulation of a given signal. The programmable slicer may also be employed with schemes involving coherent and non-coherent detection.

Figure 9:
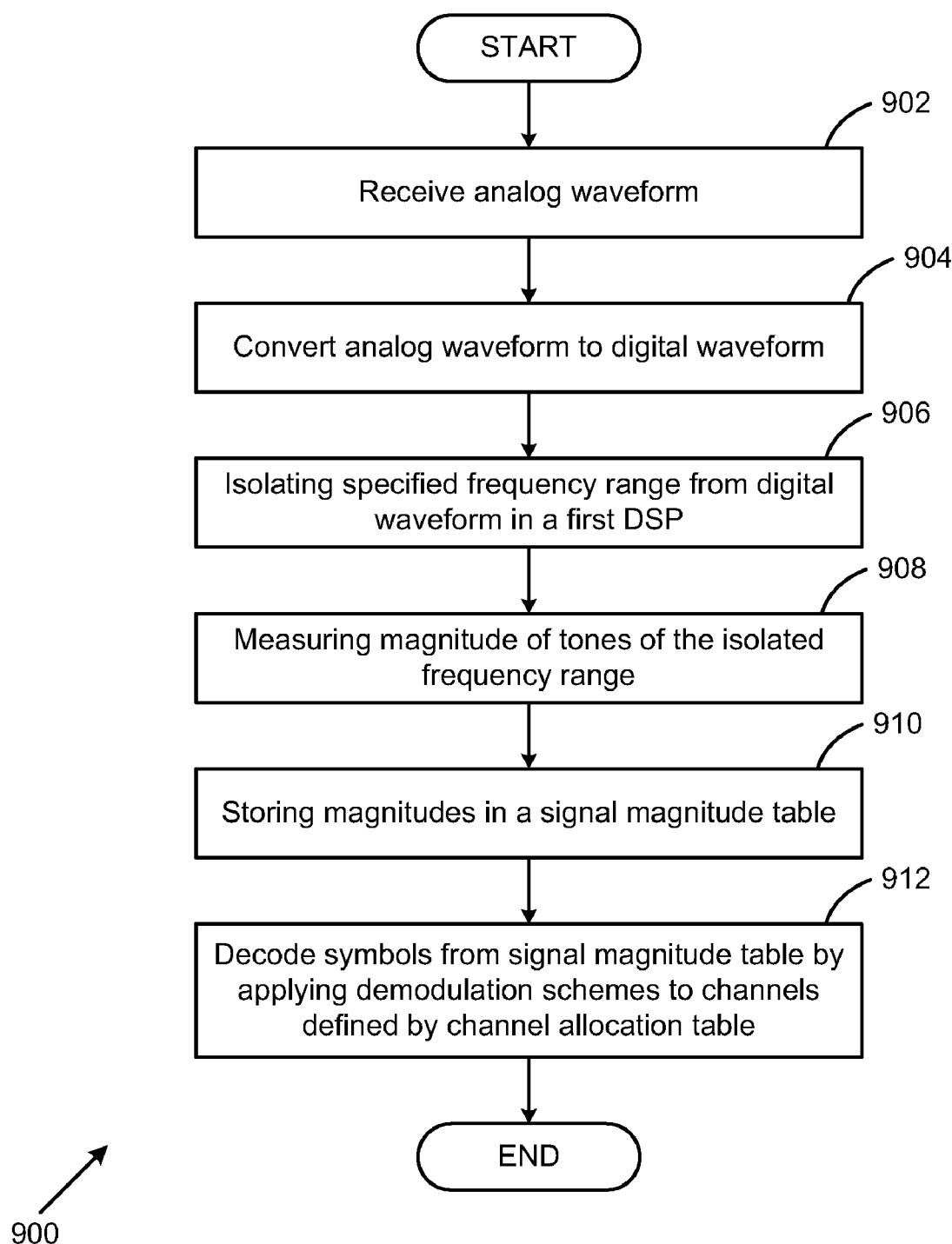
FIG. 9 depicts an exemplary embodiment of a process in accordance with the disclosure.

With reference to FIG. 9, shown is one example of a process 900 in accordance with the disclosure. The depicted process 900 illustrates operation of a programmable slicer and correlator. The process 900 can be implemented in an ADC 204, a software radio system 600, or any computing system or digital signal processing system. In box 902 and 704, an analog waveform is received and converted into at least one digital waveform. In box 906, a specified frequency range is isolated from the digital waveform. As a non-limiting example, as many power distribution systems may operate at either 50 Hz and/or 60 Hz, the signals in frequency ranges above or below such an area of interest can be considered extraneous and it may be unnecessary to process such extraneous data. As noted above, channels can be defined across the frequency range and can correspond to at least one endpoint 104 in a power distribution system 100. Because there may be hundreds or thousands of endpoints 104 in such a system, in one embodiment, each endpoint 104 can be assigned a channel that can be approximately 2-3 mHz.

In box 908 a correlator can measure the magnitude of tones across the isolated frequency range. In box 910, the correlator can store the magnitudes in a signal magnitude table for processing by a programmable slicer. In box 910, the programmable slicer can decode symbols and/or bits from channels defined by a channel allocation table by applying a demodulation scheme to the defined channels that is associated with each channel definition.

Figure 10:
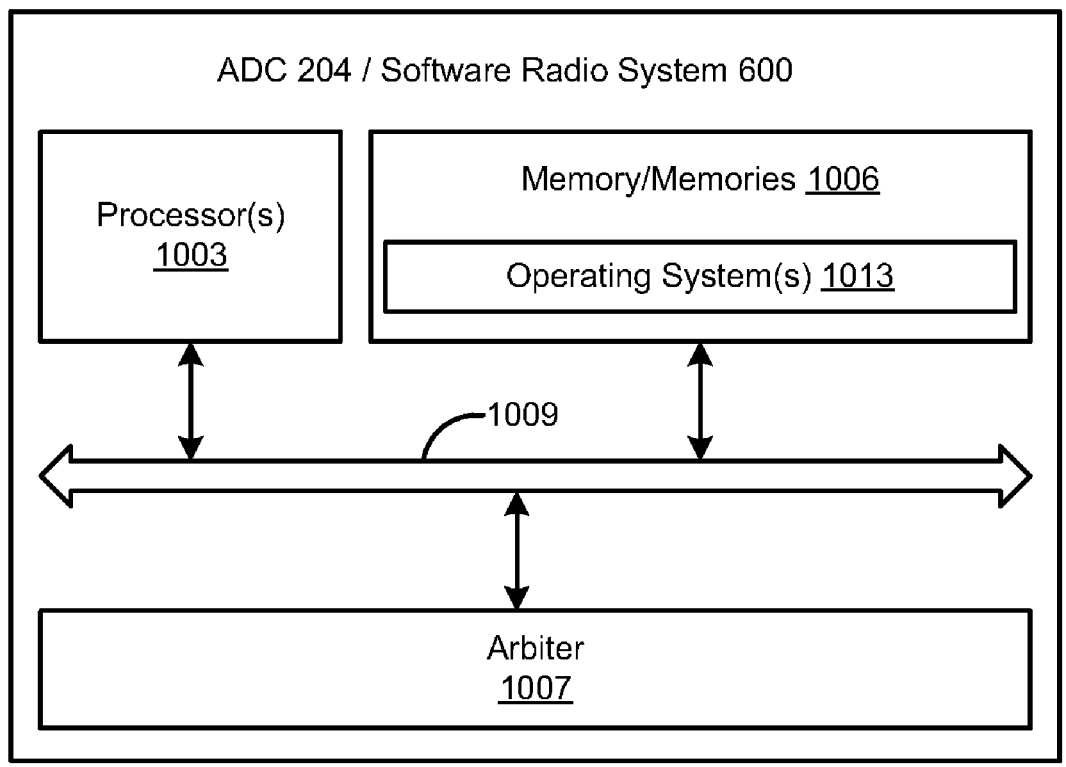
FIG. 10 depicts an exemplary embodiment of an advanced digital signal processing card and/or software radio system in accordance with the disclosure.

With reference to FIG. 10, shown is one additional example of an ADC 204 and/or software radio system 600 implementing a programmable slicer and/or correlator that includes an embedded system, one or more digital signal processors, computer, and/or equivalent device according to an embodiment of the present disclosure. In implementing the above described embodiments, the ADC 204 and/or software radio system 600 implementing a programmable slicer may include one or more processor circuits having a processor 1003, a memory 1006, and a Memory arbiter 1007 which are coupled to a local interface or bus 1009. In this respect, the local interface or bus 1009 may comprise, for example, a data bus with an accompanying control/address bus as can be appreciated.

Stored on the memory 1006 and executable by the processor 1003 are various components such as an operating system 1013. In addition, it is understood that many other components may be stored in the memory 1006 and executable by the processor(s) 1003. Also, such components may reside in a memory that is external from the distribution substation 103 as can be appreciated. It should also be noted that DSPs in an ADC 204, for example, may also include additional ports that for additional external connectivity, memory interfaces, or other ports that are not shown as they are not necessary for an appreciation of the disclosed ADC 204 architecture.

As set forth above, a number of components are stored in the memory 906 and are executable by the processor 1003. In this respect, the term "executable" refers to a program file that is in a form that can ultimately be run by the processor 1003. Examples of executable programs may be, for example, a compiled program that can be translated into machine code in a format that can be loaded into a random access portion of the memory 1006 and run by the processor 903, or source code that may be expressed in proper format such as object code that is capable of being loaded into a random access portion of the memory 1006 and executed by the processor 1003. An executable program may be stored in any portion or component of the memory 1006 including, for example, random access memory, read-only memory, a hard drive, compact disk (CD), floppy disk, or other memory components.

The memory 1006 is defined herein as volatile and/or nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 1003 may represent multiple processors and the memory 1006 may represent multiple memories that operate in parallel. In such a case, the local interface 1009 may be an appropriate network that facilitates communication between any two of the multiple processors, between any processor and any one of the memories, or between any two of the memories, etc. The processor 1003 may be of electrical, optical, or of some other construction as can be appreciated by those with ordinary skill in the art.

The operating system 1013 is executed to control the allocation and usage of hardware resources such as the memory and processing time in the ADC or software radio system. In this manner, the operating system 1013 serves as the foundation on which applications depend as is generally known by those with ordinary skill in the art.

The flow chart of FIG. 9 show the functionality and operation of an implementation of an ADC 300 and/or software radio system 600 implementing a programmable slicer and correlator. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system.

Although the functionality of various embodiments are described above with respect to the drawings as being embodied in software or code executed by general purpose or digital signal processing hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the Therefore, the following is claimed:

1. A method for demodulating a signal in a computing system, comprising the steps of:
    storing a plurality of demodulation schemes and a plurality of channel definitions in a channel allocation table, at least one of the demodulation schemes associated with each of the channel definitions;
    receiving an analog waveform comprising a plurality of channels;
    converting the analog waveform into at least one digital waveform;
    isolating a specified frequency range from the at least one digital waveform;
    measuring a magnitude of a plurality of tones within the specified frequency range;
    storing the magnitudes of the plurality of tones in a signal magnitude table; and
    decoding at least one symbol from the signal magnitude table by applying one of the plurality of demodulation schemes and one of the plurality of channel definitions to a sub-set of the magnitudes stored in the signal magnitude table, wherein the sub-set corresponds to one of the plurality of channels.

2. The method of claim 1, wherein the step of decoding further comprises:
    retrieving a first channel definition from the channel allocation table;
    retrieving a first demodulation scheme associated with the first channel definition;
    extracting a first plurality tones from the signal magnitude table according to the first channel definition; and
    decoding a first symbol from the extracted tones according to the first demodulation scheme.

3. The method of claim 2, further comprising the steps of:
    retrieving a second channel definition from the channel allocation table, the second channel definition differing from the first channel definition;
    retrieving a second demodulation scheme associated with the second channel definition, the second demodulation scheme differing from the first demodulation scheme;
    extracting a second plurality of tones from the signal magnitude table according to the second channel definition; and
    decoding a second symbol from the extracted tones according to the second demodulation scheme.

4. The method of claim 1, further comprising the step of dynamically updating the channel allocation table stored in the computing system.

5. The method of claim 1, further comprising the steps of:
    associating the at least one symbol with data from a symbol lookup table; and
    retrieving the data from the symbol lookup table associated with the decoded symbol.

6. The method of claim 1, wherein the channel definitions define a number of tones present in a specified channel.

7. The method of claim 1, wherein the demodulation schemes define how the at least one symbol is extracted from a corresponding channel from the signal magnitude table.

8. The method of claim 1, wherein the plurality of demodulation schemes include a demodulation algorithm corresponding to at least one of: frequency shift keying, on-off keying, amplitude shift keying, phase shift keying, quadrature amplitude modulation, minimum shift keying, continuous phase modulation, pulse position modulation, trellis modulation, and orthogonal frequency division multiplexing.

9. The method of claim 1, wherein the channels are approximately 2-3 mHz of the specified frequency range.

10. The method of claim 1, wherein the plurality of channels comprises a first channel representing a first subset of a total bandwidth and a second channel representing a second subset of the total bandwidth, wherein a bandwidth of the first subset is larger than a bandwidth of the second subset.

11. A software radio system, comprising:
    a programmable slicer configured to store a plurality of demodulation schemes and a plurality of channel definitions in a channel allocation table, at least one of the demodulation schemes associated with each of the channel definitions;
    at least one analog-to-digital converter configured to receive an analog waveform comprising a plurality of channels and convert the analog waveform into at least one digital waveform;
    at least one processor configured to isolate a specified frequency range from the at least one digital waveform; and
    a correlator configured to measure a magnitude of a plurality of tones within the specified frequency range and store the magnitudes of the plurality of tones in a signal magnitude table;
    wherein
    the programmable slicer decodes at least one symbol from the signal magnitude table by applying one of the plurality of demodulation schemes and one of the plurality of channel definitions to a sub-set of the magnitudes stored in the signal magnitude table, wherein the sub-set corresponds to one of the plurality of channels.

12. The system of claim 11, wherein the programmable slicer is further configured to:
    retrieve a first channel definition from the channel allocation table;
    retrieve a first demodulation scheme associated with the first channel definition;
    extract a first plurality tones from the signal magnitude table according to the first channel definition; and
    decode a first symbol from the extracted tones according to the first demodulation scheme.

13. The system of claim 12, wherein the programmable slicer is further configured to:
    retrieve a second channel definition from the channel allocation table, the second channel definition differing from the first channel definition;
    retrieve a second demodulation scheme associated with the second channel definition, the second demodulation scheme differing from the first demodulation scheme;
    extract a second plurality of tones from the signal magnitude table according to the second channel definition; and
    decode a second symbol from the extracted tones according to the second demodulation scheme.

14. The system of claim 11, wherein the programmable slicer is further configured to receive data with which to dynamically update the channel allocation table.

15. The system of claim 11, wherein the programmable slicer is further configured to:
    associate the at least one symbol with data from a symbol lookup table; and
    retrieve the data from the symbol lookup table associated with the decoded symbol.

16. The system of claim 11, wherein the channel definitions define a number of tones present in a specified channel.

17. The system of claim 11, wherein the demodulation schemes define how the at least one symbol is extracted from a corresponding channel from the signal magnitude table.

18. The system of claim 11, wherein the plurality of demodulation schemes include a demodulation algorithm corresponding to at least one of: frequency shift keying, on-off keying, amplitude shift keying, phase shift keying, quadrature amplitude modulation, minimum shift keying, continuous phase modulation, pulse position modulation, trellis modulation, and orthogonal frequency division multiplexing.

19. The system of claim 11, wherein the channels are approximately 2-3 mHz of the specified frequency range.

20. The system of claim 11, wherein the processor is further configured to generate a control signal dynamically apportioning among a plurality of endpoints an available bandwidth of a transmission medium over which the analog waveform is received.

21. A non-transitory computer readable medium containing instructions for a computing system, comprising:
    logic executed on the computing system that stores a plurality of demodulation schemes and a plurality of channel definitions in a channel allocation table, at least one of the demodulation schemes associated with each of the channel definitions;
    logic executed on the computing system that receives an analog waveform comprising a plurality of channels;
    logic executed on the computing system that converts the analog waveform into at least one digital waveform;
    logic executed on the computing system that isolates a specified frequency range from the at least one digital waveform;
    logic executed on the computing system that measures a magnitude of a plurality of tones within the specified frequency range;
    logic executed on the computing system that stores the magnitudes of the plurality of tones in a signal magnitude table; and
    logic executed on the computing system that decodes at least one symbol from the signal magnitude table by applying one of the plurality of demodulation schemes and one of the plurality of channel definitions to the magnitudes stored in the signal magnitude table, wherein the sub-set corresponds to one of the plurality of channels.

22. The computer readable medium of claim 21, further comprising:
    logic executed on the computing system that retrieves a first channel definition from the channel allocation table;
    logic executed on the computing system that retrieves a first demodulation scheme associated with the first channel definition;
    logic executed on the computing system that extracts a first plurality tones from the signal magnitude table according to the first channel definition; and
    logic executed on the computing system that decodes a first symbol from the extracted tones according to the first demodulation scheme.

23. The computer readable medium of claim 22, further comprising:
    logic executed on the computing system that retrieves retrieving a second channel definition from the channel allocation table, the second channel definition differing from the first channel definition;
    logic executed on the computing system that retrieves a second demodulation scheme associated with the second channel definition, the second demodulation scheme differing from the first demodulation scheme;
    logic executed on the computing system that extracts a second plurality of tones from the signal magnitude table according to the second channel definition; and
    logic executed on the computing system that decodes a second symbol from the extracted tones according to the second demodulation scheme.

24. The computer readable medium of claim 21, further comprising logic executed on the computing system that dynamically updates the channel allocation table stored in the computing system.

25. The computer readable medium of claim 21, further comprising:
    logic executed on the computing system that associates the at least one symbol with data from a symbol lookup table; and
    logic executed on the computing system that retrieves the data from the symbol lookup table associated with the decoded symbol.

26. The computer readable medium of claim 21, wherein the channel definitions define a number of tones present in a specified channel.

27. The computer readable medium of claim 21, wherein the demodulation schemes define how the at least one symbol is extracted from a corresponding channel from the signal magnitude table.

28. The computer readable medium of claim 21, wherein the plurality of demodulation schemes include a demodulation algorithm corresponding to at least one of:
    frequency shift keying, on-off keying, amplitude shift keying, phase shift keying, quadrature amplitude modulation, minimum shift keying, continuous phase modulation, pulse position modulation, trellis modulation, and orthogonal frequency division multiplexing.

29. The computer readable medium of claim 21, wherein the channels are approximately 2-3 mHz of the specified frequency range.

* * * * *